United States Patent [19]

Minghetti et al.

[11] Patent Number: 5,911,943

[45] Date of Patent: Jun. 15, 1999

[54] METHOD OF THERMOFORMING A SHEET MATERIAL

[76] Inventors: Ettore Minghetti, 8739 Heritage Dr., Florence, Ky. 41042; Harry W. Cheesman, 12 Old Beaver Rd., Walton, Ky. 41094

[21] Appl. No.: 08/888,975

[22] Filed: Jul. 7, 1997

[51] Int. Cl.$^6$ .......................... B29C 51/12; B29D 22/00
[52] U.S. Cl. ................ 264/516; 264/554; 264/237; 264/322; 475/504; 475/388
[58] Field of Search .................... 264/516, 322, 264/554, 271.1, 512, 278, 237, 348; 425/504, 388

[56] References Cited

U.S. PATENT DOCUMENTS

| | | | |
|---|---|---|---|
| 2,876,498 | 3/1959 | Nason | 264/516 |
| 4,608,744 | 9/1986 | Nemoto | 264/516 |
| 5,514,315 | 5/1996 | Watkins et al. | 264/512 |
| 5,525,290 | 6/1996 | Carpenter | 264/271.1 |

*Primary Examiner*—Jan H. Silbaugh
*Assistant Examiner*—Edmund H. Lee
*Attorney, Agent, or Firm*—Robert R. Gavlik

[57] ABSTRACT

The present invention relates to a method of thermoforming a sheet material around an insert to make a thermoformed article. The sheet material may include poly(methyl) methacrylate and other thermoplastic sheet material. The inserts become an integrated part of the thermoformed product, and are characterized by having at least one removable portion or plug. The plug(s) are removed during the thermoforming process, and allow the thermoformed sheet material to shrink without creating undesirable levels of stress in the sheet material. This prevents cracking or other failure of the sheet material.

4 Claims, 4 Drawing Sheets

METHOD OF THERMOFORMING A SHEET MATERIAL

TECHNICAL FIELD

This invention relates to reinforcing inserts used in combination with thermoformable sheet material. These inserts serve two functions. First, they provide at least one rigid surface over which the sheet is thermoformed. That is, they act as a mold for the heated sheet during the thermoforming process. Second, these inserts provide reinforcement to the finished product such as acrylic spas, shower stall floors, burial caskets, and the like.

BACKGROUND OF THE INVENTION

Thermoformable products such as acrylic spas, shower stalls, burial caskets, and the like inherently suffer from the same drawback. Economic and manufacturing limitations make the finished product susceptible to fracturing at stress bearing points. For instance, the steps and bottom of spas, shower stall floors, and any point of curvature of an acrylic sheet are all prone to cracking. These stress points develop because the acrylic sheet flexes under load and the stresses concentrate in specific areas to a level high enough to cause the part to fail.

Thermoformable sheets are typically heated above their heat distortion temperature (HDT) in the initial stages of a thermoforming process. This causes the sheet to expand proportional to the material's coefficient of thermal expansion (COTE). After the forming stage of the process, the sheet is allowed to cool. The cooling stage causes the sheet to shrink unless the shrinkage is inhibited by a foreign object such as a typical prior art mold or insert. As the sheet cools around a rigid insert, it cannot shrink easily, if at all. Therefore, stress accumulates in some areas, such as in corners. Thinning of the material also occurs in these areas. Usually, the inserts will restrict the contraction of the sheet in areas of curvature and the material becomes susceptible to fracturing. The thermoformed product may even crack during cooling to room temperature. This deficiency is characteristic of all plastic sheet materials and is particularly evident with acrylic sheets, such as poly(methyl) methacrylate (PMMA). It may also occur in composite sheets made of PMMA and a thermoplastic substrate layer such as acryonitrile butadiene styrene (ABS), or other materials.

Attempts have been made to reinforce acrylic and similar type products. Favaron, in U.S. Pat. No. 5,400,556 discloses a step system for swimming pools comprising a unitary stair module including a stair shell formed of plastic sheet material and a plurality of elongated rigidizing members which are encapsulated within the plastic sheet material of the shell, and support braces for supporting the unitary stair module.

While the above reference discloses a method for providing support to a thermoplastic sheet material, the difficulties associated with stress build up in and near areas of curvature have not been avoided. These difficulties are not as critical in products such as a modular step systems wherein there are few areas of curvature greater than 90°. That is, where the thermoplastic material has been deformed by more than 90°. Additionally, the above reference does not address the difficulties encountered with sheet material thermoformed over an area greater than a few square feet.

The present invention alleviates the stress associated with deformation of an acrylic or other thermoplastic sheet by more than about a 90° angle. The present invention also alleviates the stress associated with thermoforming large areas of sheet material over male type mold configurations. By male type configurations, we mean thermoformed sheets placed over a shaped profile, wherein the shape raises from the horizontal plane and the thermoforming process allows the sheet to be draped over it. Inserts are positioned on top of the male type configuration or the horizontal surface. The inserts will be enveloped by the formed sheet, so that they will be trapped by it. In the present invention, "removable plug" section(s) are positioned within the inserts, and can be removed when the thermoformed part is removed from the mold. In doing so, the inserts are allowed to become shorter, thus the thermoformed material is not subjected to the same level of stress, that a thermoformed material would be exposed to with a typical molded insert. This technique allows for a stronger, more resilient finished product that is not as susceptible to fracturing.

SUMMARY OF THE INVENTION

One object of the present invention is to provide a new and improved type of insert for use with thermoformable plastic and acrylic sheets. These inserts provide rigidity and stability to the thermoformed product, and become an integral part of the finished product.

Another object of the present invention is to provide a new and improved type of insert having at least one removable portion that, prior to complete cooling of the sheet material, is removed thereby allowing the insert to, in effect, shrink from its original size.

A further object of the present invention is to provide a new and improved type of insert wherein stress fracturing in areas of deformation of the original sheet material is either eliminated, or is greatly reduced. This is believed to be attributable, to a large extent, to the ability of the insert of the present invention to shrink from its original size after the removable portion is removed. The insert of the present invention has the ability to reduce, or eliminate stress, and the accompanying tendency to fracture, but its reinforcing properties are not compromised to any appreciable extent.

Yet another object of the present invention is to provide a method of reducing stress in thermoformed products having a permanent insert incorporated therein by pre-heating the mold insert prior to thermoforming the plastic or acrylic material, thereby reducing the difference in the COTE between the thermoformable material and the mold insert. That is, a heated insert will also shrink to some extent, depending on its own COTE, upon cooling. This shrinkage creates space for the sheet material to contract into, which thereby reducing stress in the shrinking acrylic or thermoplastic material.

The new and improved inserts of the present invention find use in such applications as the spa, burial casket, and plumbing-ware industries. These inserts possess the unique feature of having at least one removable portion. The insert allows the thermoplastic or acrylic (both referred to herein as sheet material) to be thermoformed around the insert thereby providing rigidity and support to the final product. Removal of the removable plug section of the insert allows the insert structure to, in effect, shrink or constrict from its original size.

BRIEF DESCRIPTION OF THE DRAWINGS

FIG. 3a is a profile suitable for the finished parts shown in FIG. 4a and 4b.

DETAILED DESCRIPTION OF THE INVENTION

The inserts that will remain in the formed part and the removable plug claimed herein may be made of varying types of material. Preferably, the material is wood, metal, or plastic. The plastic, preferably, has a HDT above the sheet material to be thermoformed. The choice of materials should be guided by practical considerations aimed at facilitating the demolding step after the thermoforming. In the preferred embodiment, the insert comprises a plastic material having a COTE similar to that of the thermoformed sheet. If the insert is heated prior to the thermoforming operation, the actual shrinkage of the insert will more closely match that of the sheet material, and the insert will shrink during the cooling phase of the operation, thereby reducing the accumulation of stress to an even greater extent.

The thickness of the removable plug depends on the type of sheet material and insert frame used. The removable plug should have a thickness of about 10 to 100% of the thermal shrinkage calculated for the main dimensions and for the temperature difference between the thermoforming process and room temperature. Preferably, the thickness will be between 40 and 90%. However, the sheet material, the geometry of the finished part and the number of removable inserts will dictate the required thickness.

The removable plugs can be held in place during the thermoforming operation. Once the removable plugs are taken out, the formed part may have to be repositioned over the mold until the material is cooled. Preferably, the insert is in contact with a male mold such as those typically used in vacuum forming processes. At an appropriate point in the operation, the insert and molded sheet can be easily slid off the vacuum forming mold. Most preferably, the insert is removed at a temperature 5–50° F. below the HDT.

Our invention comprises the steps of: heating the sheet material above the HDT by any suitable method known in the art, and optionally heating the mold and inserts; contacting the sheet material with the mold surfaces by means of vacuum or pressure; cooling the sheet material below the HDT; and removing the removable plugs wherein the insert frame without the removable portions is held in place by the formed part, until the sheet material reaches room temperature and/or the thermal shrinkage is complete. The invention is illustrated by, but not limited to the following Examples.

EXAMPLES 1

Figure 1:
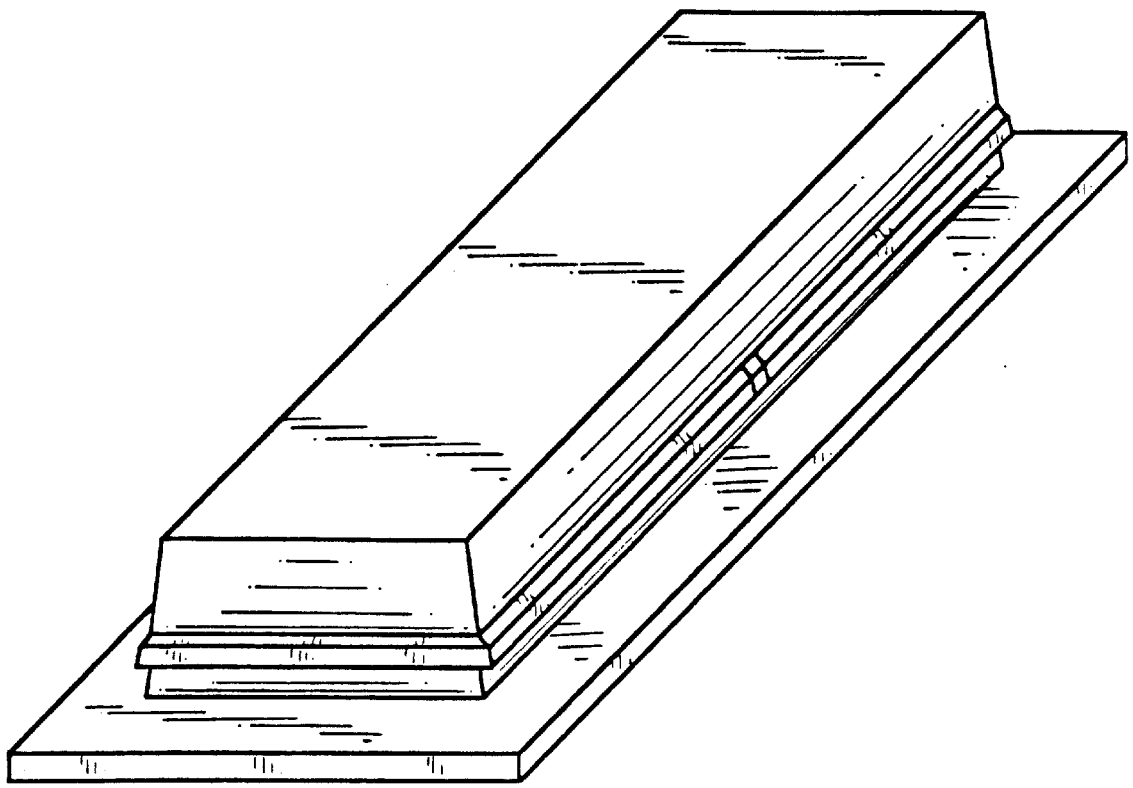
FIG. 1 shows a more or less typical male type mold suitable for use in thermoforming operations and onto which the insert frame of FIG. 2, is mounted. Notice that the material of the insert can be chosen from among wood, metal or plastic. The shape of the insert is that which is most suitable for the given application.
Figure 2:
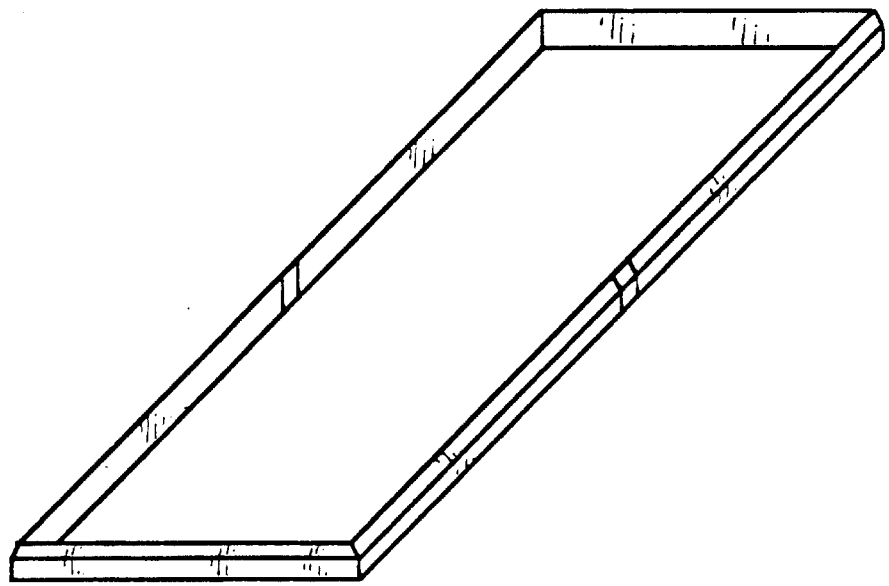
Figure 3A:
FIG. 3a–3f show typical designs for the removable plug portion.
Figure 3B:
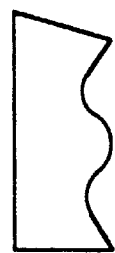
Figure 3C:
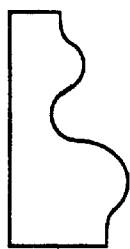
Figure 3D:
Figure 3E:
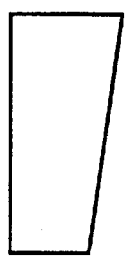
Figure 3F:
Figure 4A:
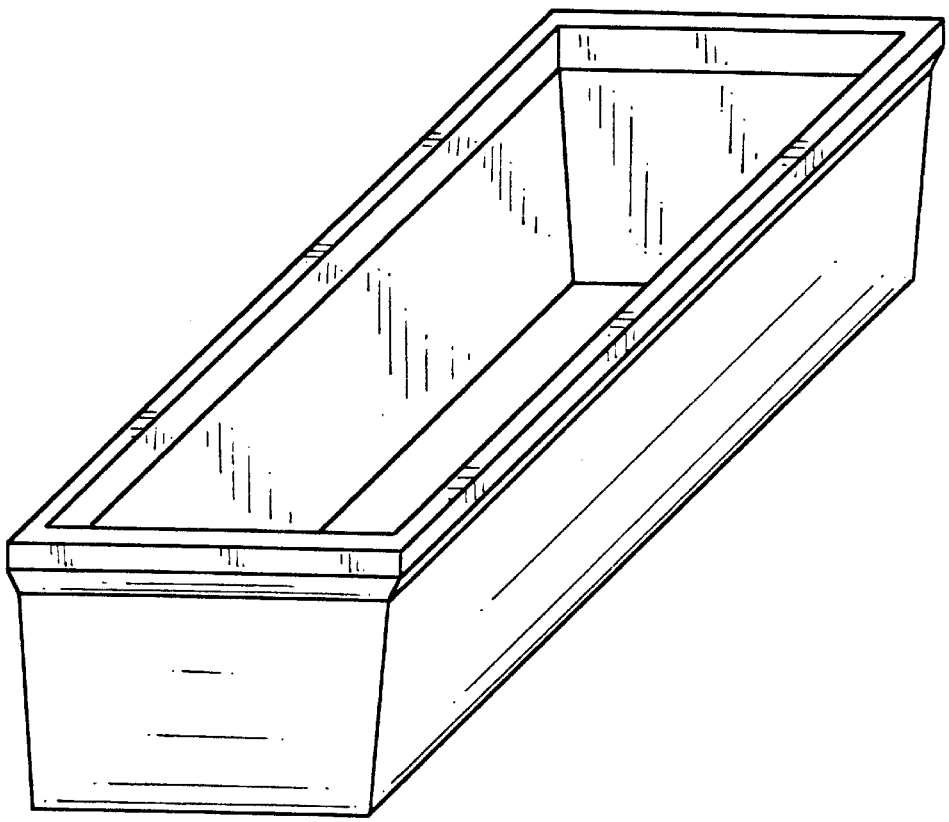
Figure 4B:
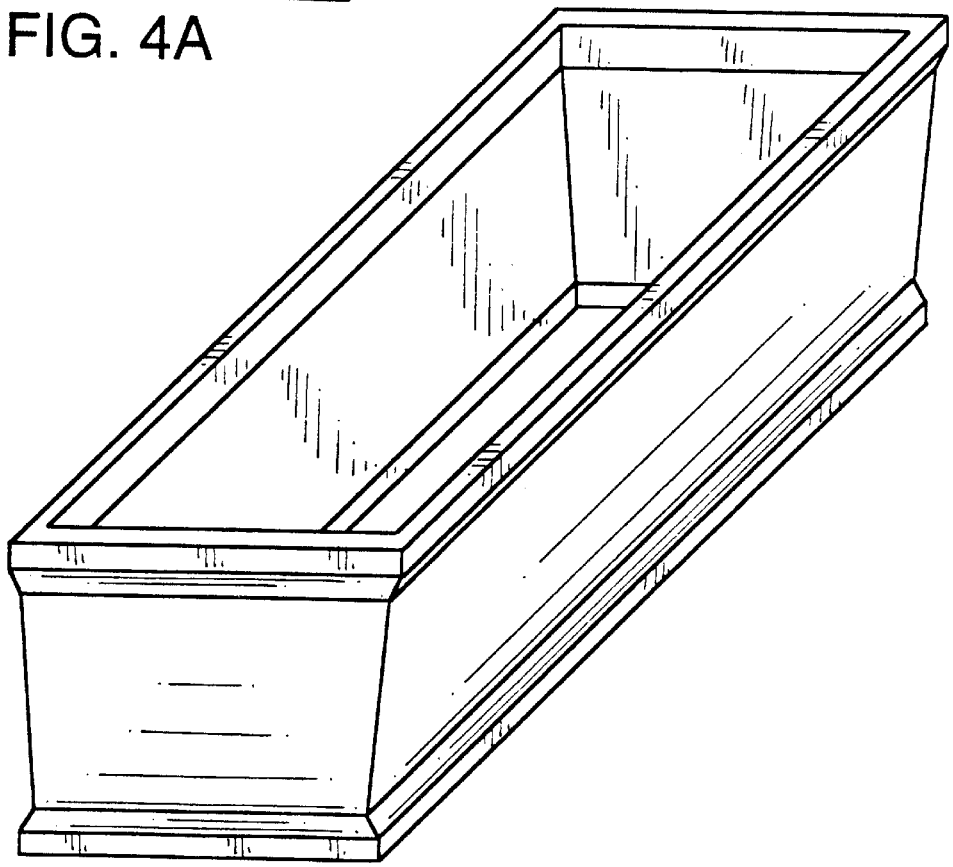

A male mold insert of the approximate size 26"×81" and 17½" high was fabricated from wood elements and is shown in FIG. 1. A vacuum box approximately 40"×95"×23" deep, fabricated from plywood, was used to pre-stretch the acrylic sheet prior to drawing it over the male mold. This is referred to as the "snap back" method in known art. The plastic sheet was a composite structure of ABS and crosslinked acrylic, 0.275" thickness, produced by Aristech Chemical Corporation under the name Altair Plus™. The sheet was cut to 45"×100" and clamped in a holding frame mounted in a scissor lift table. The scissor lift table and acrylic sheet were mechanically driven into an electric infrared oven, to be heated. The sheet, heated to the recommended forming temperature of 380° F. on the acrylic side, was driven out of the oven to a fixed position directly below the pre-stretch vacuum box. The sheet was raised by means of the scissor lift until it made contact with the opening of the vacuum box. Vacuum was applied to the box, to draw the acrylic sheet into a bubble. The male mold was then raised, also by means of a scissor lift table until the platform of the mold made contact with the acrylic sheet. Vacuum was released in the vacuum box allowing the heated acrylic sheet to snap back over the mold. Vacuum was then applied to the mold to complete the forming process. After cooling to below the heat distortion temperature, the mold and the formed acrylic part were lowered from the pre-stretch box. Vacuum was released in the male mold, the clamp frame opened and the formed part raised off of the mold. This forming procedure is part of the known art and is not significant for our invention. The removable plugs in the insert frame were immediately removed.

The procedure for determining the dimensions and number of removable plugs, used in the Examples, is as follows:

| Step 1: | Define the key temperatures and COTE. | |
|---|---|---|
| | Thermoforming temperature of Altair-Plus: | 380° F. |
| | Heat distortion temp. of Altair-Plus: | 193° F. |
| | Temperature at which the part is to be pulled from the mold: | 180° F. |
| | Room temperature: | 80° F. |
| | COTE of Altair-Plus sheet: | 4.3 × 10$^{-5}$ in/in ° F. |

Step 2: Calculate the amount of shrinkage after forming along a given dimension of the formed part.
  Shrinkage from the forming temperature to the temperature at which the part is removed from the mold:
    $(380°-180°) \times 4.3 \times 10^{-5} \times 81" = 0.7"$
  Shrinkage to room temperature:
    $(180-80) \times 4.3 \times 10^{-5} \times 81" = 0.35"$
  Total shrinkage=0.7"+0.35"=1.05"
  wherein, 380° F. is the thermoforming temperature; 180° F. is the temperature at which the formed sheet material is removed from the mold; 80° F. is the room temperature; $4.3 \times 10^{-5}$ is the COTE of the thermoformed sheet material; and 81" is the length of the sheet material along the dimension used in the above calculation.

Step 3: Selection of the thickness of the removable plugs.
  The initial thickness of the removable plugs were chosen between 35 and 65% of the total shrinkage, as calculated in Step 2.
  Not all of the shrinkage calculated above will occur, because the mold and the insert frames will not remain at room temperature throughout the forming cycle. Also, a shrinking plastic material deforms itself as it pulls onto the mold/insert frame due to its viscoelastic nature. As stated previously, the geometry of the part, and of the insert frame, the type of materials used will all have to be considered.

For insert dimensions of about than 24 inches or shorter, the removable plug can be omitted. If the overall shape is about square, a removable plug is recommended for each of the four sides.

From the above, the dimension of the removable plugs for Example 1 was selected to be 0.5 inches or about half of the theoretical shrinkage:

$$\frac{.500}{1.05"} \times 100 = 48\%.$$

It should be noticed that in the part of Example 1, there were only two removable plugs in the longest inserts of the rectangular shape. The shortest inserts were about one third in length, which made the predicted thickness of the removable plug quite small.

The removable plugs were made as follows: a thickness of 0.500" was cut out of the middle of the two longest sides and two removable plugs of the same thickness and shape were put in place in the insert frame. After the removal of the plugs and the cooling to room temperature, the insert frame was tightly in place and no sign of stresses, i.e. no growth of cracks or twisting of the overall shape were noticed before or after the edge of the parts were trimmed.

COMPARATIVE EXAMPLE 1a

The procedure of Example 1 was repeated without removable plugs in the insert frame. A large crack developed when the trim was cut off from around the perimeter of the box, around the top inside edge of Drawing A, FIG. 3.

EXAMPLE 2

Figure 5:
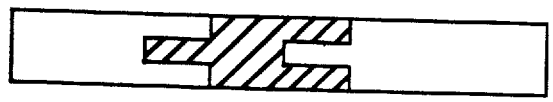
FIG. 5 shows a more or less typical cross section of a removable plug. Note that after the plug is removed, the tongue portion of section B will slide into the groove of section A.
Figure 6A:
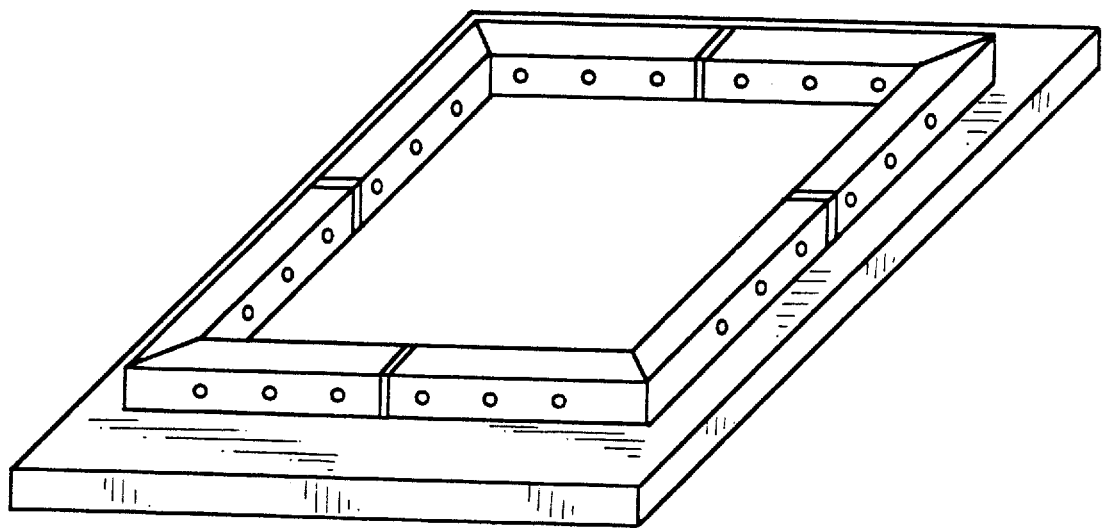
FIG. 6a and 6b show a mixed male and female mold design that is suitable for the thermoforming of shower bases. For this application, the material of construction in this type application is typically wood, except for the inserts and the removable plug. These were fiberglass and polyester pultruded profiles appropriately cut and assembled.
Figure 6B:
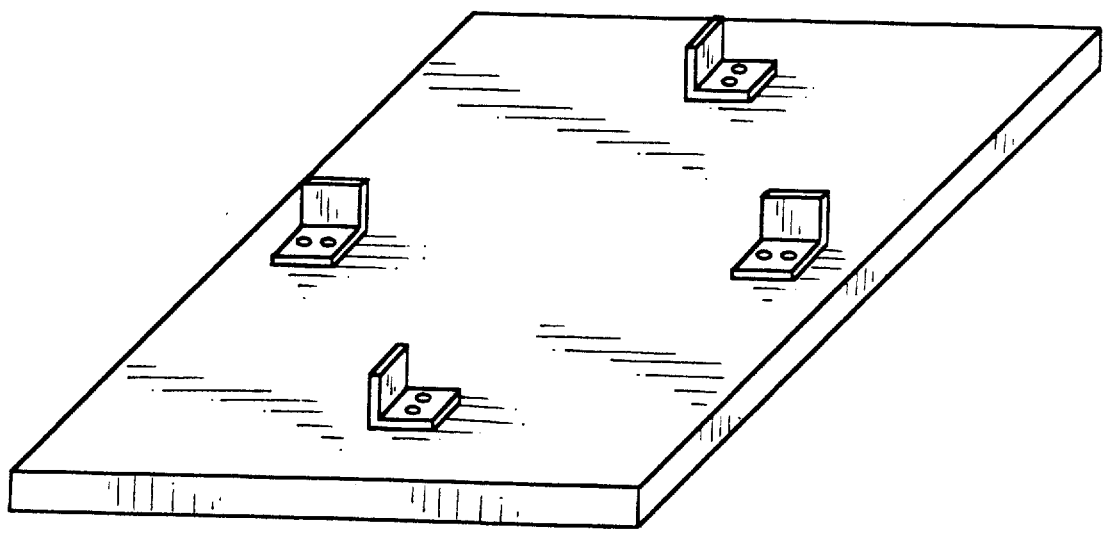

A male mold of approximate size of 48"×48" and 4" high was fabricated from wood elements. Channel profiles 2"×3½" were used to fabricate the insert frame which measured 36"×36", see FIGS. 5A and 5B. The channel profiles were U shaped, with a wall thickness of 0.187". They were produced by pultrusion, from fiberglass and polyester. The total shrinkage of the formed part over the 36" long reinforcing inserts was calculated to be about 0.46 inches.

The removable plugs were chosen to be 40% of it, equal to about 0.187". The removable plugs in this example were designed and fabricated in a manner that would allow them to be mounted on the mold and remain there as the formed part and the reinforcing inserts were removed, see FIG. 5B. The removable plugs were located at the mid-point of each side of the insert frame.

The plastic sheet used was 0.275" thick Quarite Plus™, a PMMA/ABS sheet material manufactured by Aristech Chemical Corporation. The sheet was cut to 54"×54" and clamped in a holding frame mounted in a scissor lift table. The scissor lift table and sheet were mechanically driven into an electric infrared oven to be heated. The sheet, heated to the recommended forming temperature of 380° F. on the acrylic side, was lowered by means of the scissor lift table until it made contact with the mold positioned directly below. Once the heated sheet was lowered onto the mold and formed by applying vacuum, the formed part was allowed to cool below the heat distortion temperature. The vacuum was then released and the formed part was lifted off the mold.

The reinforcing inserts remained trapped in the formed part and the gap left between them gradually disappeared, as the formed part cooled to room temperature.

COMPARATIVE EXAMPLE 2A

The procedure of Example 2 was repeated using the same mold set-up and Quarite-Plus™ sheet, but the part was left on the mold until it cooled to room temperature. There was no evidence of self-initiated cracks until we began cutting the trim from around the base of the formed inserts. As the small disc of the cutting saw approached each corner, cracks would self-start in one or both of the vertical directions.

EXAMPLE 3

The same mold and procedure of Example 2 was used to thermoform a part from an Aristech I-3 6385 white, 0.125" thick acrylic sheet. When the part was removed from the mold, the inserts remained trapped in it (without the removable plugs that stayed with the mold). There were no cracks generated upon cooling to room temperature or when the part was trimmed around the base of the inserts.

COMPARATIVE EXAMPLE 3A

The procedure of Example 3 was repeated using the same mold and I-3 sheet, but the formed part was left cooling on the mold. When the surface temperature of the acrylic reached about 130°–140° F., some noises were heard and cracks began to appear in the acrylic, at the four corners of the formed part.

We claim:

1. A method of thermoforming a sheet material to make a thermoformed article comprising the steps of:
   (a) heating the sheet material above the heat distortion temperature of the sheet material;
   (b) contacting the heated sheet material with an insert having an original size, and comprising at least one removable portion, wherein the heated sheet material is deformed around the insert in the original size to form at least one area of deformation;
   (c) cooling the deformed sheet material to form the thermoformed article,
   wherein the at least one removable portion of the insert is removed prior to complete cooling of the deformed sheet material, and wherein the insert, after removal of the at least one removable portion, shrinks from the original size during the cooling to reduce stress fracturing in the at least one area of deformation and remains with the thermoformed article.

2. A method according to claim 1 wherein the sheet material comprises poly(methyl) methacrylate.

3. A method according to claim 2 wherein the sheet material has a thermoplastic substrate material integral therewith.

4. A method according to claim 3 wherein said thermoplastic substrate material is ABS.

* * * * *